United States Patent [19]

De Feo et al.

[11] 3,880,479
[45] Apr. 29, 1975

[54] EMERGENCY BEARINGS FOR ROTATING SHAFT SYSTEMS

[75] Inventors: Angelo De Feo, Totowa Boro; Mark R. Kulina, Franklin Lakes; Earl B. Norwood, Westwood, all of N.J.

[73] Assignee: Curtiss-Wright Corporation, Wood Ridge, N.J.

[22] Filed: Sept. 4, 1973

[21] Appl. No.: 394,051

[52] U.S. Cl. ............ 308/36; 29/191; 29/199; 75/173 C; 308/35; 308/37; 308/239; 308/241
[51] Int. Cl...... C22c 5/00; F16c 17/02; F16c 17/20
[58] Field of Search............... 29/191, 196.3, 199; 75/173 C; 308/35, 36, 37, 78, 121, 122, 239, 241

[56] References Cited
UNITED STATES PATENTS

| | | | |
|---|---|---|---|
| 1,194,463 | 8/1916 | Bache | 308/239 |
| 1,961,134 | 6/1934 | Buckwalter | 308/35 |
| 2,241,789 | 5/1941 | Queneau et al. | 308/239 X |
| 2,377,882 | 6/1945 | Hensel et al. | 75/173 C X |
| 2,451,907 | 10/1948 | Betteridge | 75/173 C X |
| 2,961,277 | 11/1960 | Sternlicht | 308/35 X |
| 3,411,706 | 11/1968 | Woollenweber, Jr. et al. | 308/35 |

FOREIGN PATENTS OR APPLICATIONS

| | | | |
|---|---|---|---|
| 206,788 | 1/1940 | Switzerland | 308/239 |

*Primary Examiner*—M. Henson Wood, Jr.
*Assistant Examiner*—Howard Beltran
*Attorney, Agent, or Firm*—Raymond P. Wallace; Victor D. Behn

[57] ABSTRACT

A system and apparatus for controlling excessive vibration of a rotating shaft at critical speed or when a large imbalance suddenly occurs, comprising an emergency bearing having sufficient radial clearance that it does not normally engage the shaft, and located longitudinally at a portion of the shaft which is sensitive to excessive vibration, and where it will raise the critical speed of the shaft system when additional support is added at that position. The bearing is of inexpensive contruction of silver alloy, and of such design that it requires no lubrication during the period when the shaft is passing through the critical speed and the bearing is operative.

3 Claims, 6 Drawing Figures

PATENTED APR 29 1975            3,880,479

SHEET 2 OF 3

EMERGENCY BEARINGS FOR ROTATING SHAFT SYSTEMS

BACKGROUND OF THE INVENTION

This invention relates to rotating shaft systems which may be subject to periodic excessive vibration, and more particularly to means for controlling excessive vibration and preventing damage therefrom.

A requirement for the proper design of rotating shaft systems is to place the primary bending modes of the shaft system outside the normal operating speed range of the shaft. A common method of doing this is to install bearings at specific locations along the shaft length, thus adding stiffening at those points and thereby raising the critical speed. The critical speed is defined as the rotational speed of a shaft at which an imbalance force coincides with the fundamental or some higher mode of the natural frequency of transverse vibration of the shaft and its attached masses.

The expedient of installing bearings of a type suitable for continuous service, with their accompanying lubricating feed, at a position where bending vibration might intermittently occur raises both the weight and cost of the equipment, and increases the problem of alignment. For this reason, if the bending mode is only such as arises from the normal imbalance of a well-designed shaft system, if it occurs at a speed which must be passed through but is below the speed range of normal operation, and if the system is such that the critical speed is passed through quickly in running up to normal operating speed and equally rapidly while running down, it may be ignored and a bearing at that point omitted. However, this practice is suitable only in situations where all operating conditions are precisely known, where it is possible to pass through the critical speed with sufficient rapidity, and where no unexpected event may occur.

One type of such an unexpected event is the sudden occurrence of a large imbalance in the shaft system, such as when a turbine rotor loses a blade. The spring rates of journal bearings increase significantly with bearing load and a rotating system will have different resonant response when it operates with large imbalances. The normal bearings of the system would be unable to control the shaft vibration, with the likelihood of severe damage to the system.

SUMMARY

This invention provides means of controlling excessive shaft vibration inexpensively and without adding undue weight. A detuner is provided at one or more shaft locations in a shaft system, comprising an emergency bearing of light weight and of such design as to be able to operate for brief periods without lubrication, the bearing having an internal diameter of such dimension as to be free of radial contact with the shaft during any condition of normal operation, but with the clearance being no greater than the amount of vibration that can be tolerated. The bearing is of such design and fabricated of such materials that it can bear heavy loads for short periods without lubrication.

DESCRIPTION OF THE PREFERRED EMBODIMENTS

Figure 1:
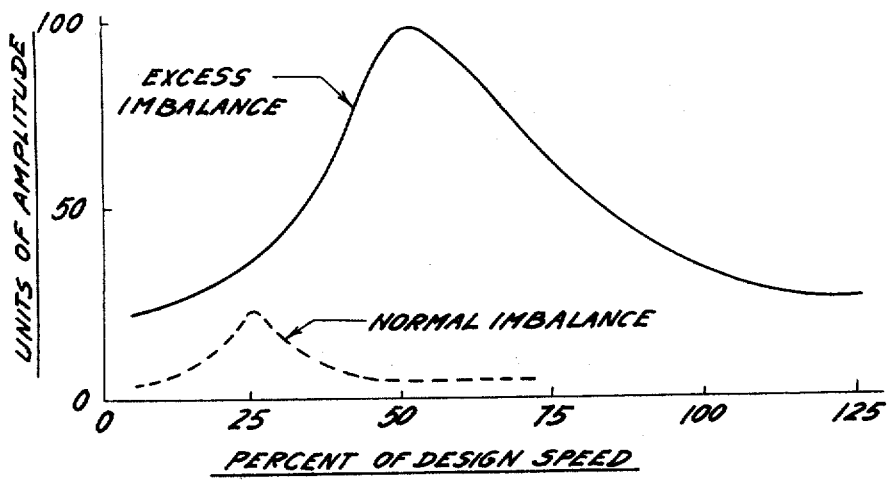
FIG. 1 is a graph of the vibrational response of a two-bearing shaft system, showing peak amplitude of vibration for both a normal imbalance and for a large imbalance, at varying percentages of normal operating speed.

FIG. 1 is a graph showing examples of transverse vibrational amplitude in a two-bearing shaft system, with amplitude designated in arbitrary units and varying in accordance with the percentage of the speed for which the system is designed. The curves for vibration with the normal system imbalance and with excess imbalance are both to be regarded as illustrative only, since the heights of the peaks and their percentage positions will vary with different designs, with the amount of imbalance regarded as normal, and with the amount of excess imbalance which may occur.

The dotted line in FIG. 1 is the curve for vibration with normal imbalance, having a peak amplitude of about 20 units occurring at about 25% of the speed of revolution for which the system is intended. In the system illustrated 20 units is regarded as a tolerable amount of vibration for short periods, and since the machine accelerates rapidly through the 25% region no damage is caused and the normal vibration may be ignored.

The solid line of FIG. 1 is a curve exemplary of the occurrence of a large imbalance in the system, such as the loss of a blade from a turbine rotor, or in other types of systems a shifting of the load or the addition of an unbalanced load. Although the peak is shown as 100 units of amplitude occurring at 50% of design speed, it may of course be of different magnitude and occur at a different speed, owing to flexibility characteristics of bearings and other mechanical considerations. In any case, it is considered to be an intolerable condition, liable to result in damage to the machine before it can be shut down.

Figure 2:
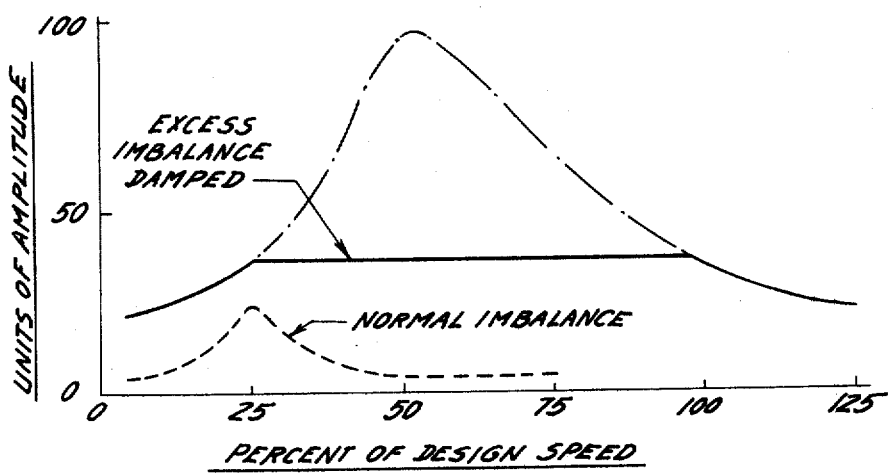
FIG. 2 is a similar graph showing flattening of the peak amplitude of vibration of excess imbalance, by the use of this invention.

In FIG. 2 there is shown the same set of conditions, but with the present invention incorporated in the system. The peak amplitude of excess imbalance as formerly occurring is shown in dash-dot line, but now damped by the use of the emergency bearing, as shown by the solid line. The vibration of normal imbalance is shown as before, being unaffected by the use of the invention.

Figure 3:
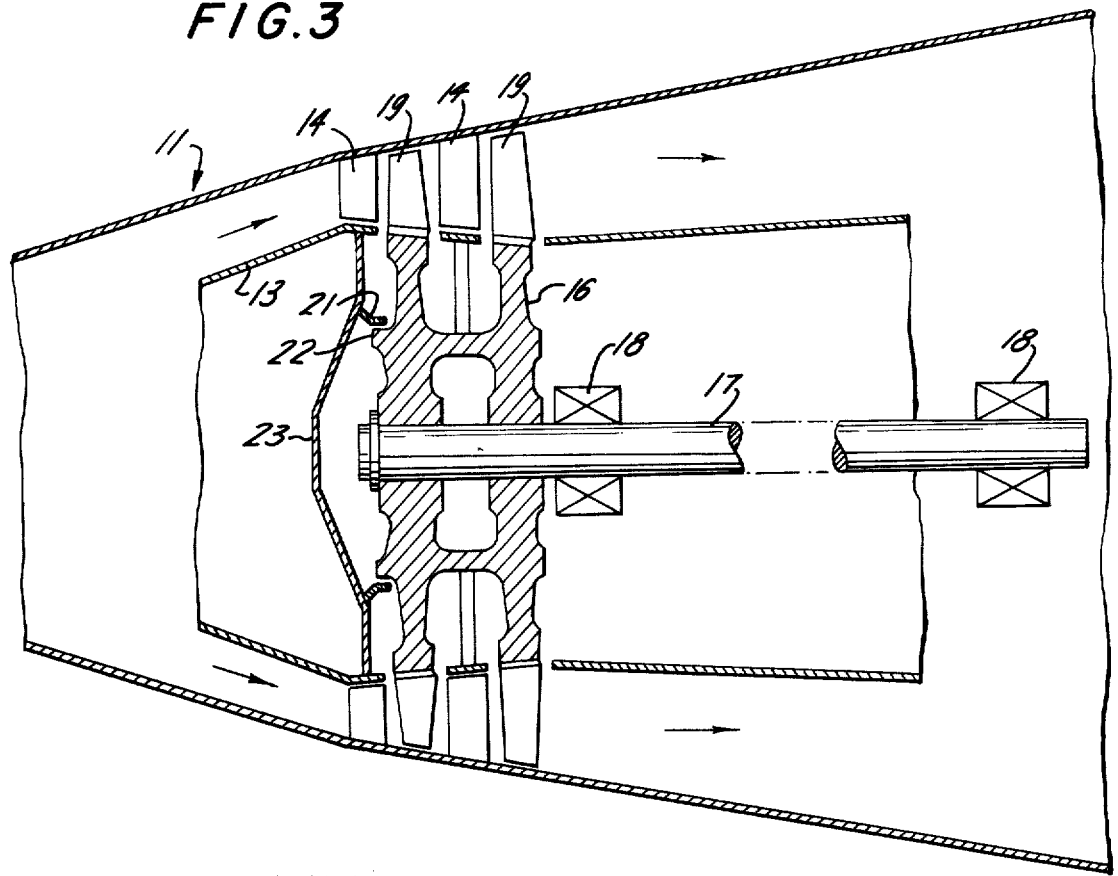
FIG. 3 is a semischematic cross-section elevation of a power turbine embodying the invention.

FIG. 3 shows generally a power turbine 11 incorporating the invention, details not necessary for an understanding of the invention being omitted. The turbine comprises an outer casing 12 and an inner casing 13 defining an annular space through which gases are admitted in the direction of the arrows to drive the turbine, after which the gases are exhausted downstream from the turbine. Stator blades 14 are provided to direct the gases to the turbine rotor 16. The rotor is borne overhung on a shaft 17, which is supported by two service bearings 18, shown schematically. The rotor exemplified is double, having turbine blades 19.

In the event that the rotor should lose a blade during operation, there would occur a marked imbalance of the shaft system, with the likelihood of destruction or severe damage to the machine. There is provided, therefore, an emergency bearing 21 surrounding a journal portion 22 in the overhung portion of the shaft system. Although as shown here the journal 22 is an annular member projecting from the forward side of the rotor 16, it can equally well comprise a portion of the shaft 17 in the overhung portion. The bearing 21 in this case is shown as supported on a wall 23 upstream of the rotor, but it may be supported on any convenient stationary portion of the structure adjacent to the shaft system.

Figure 4:
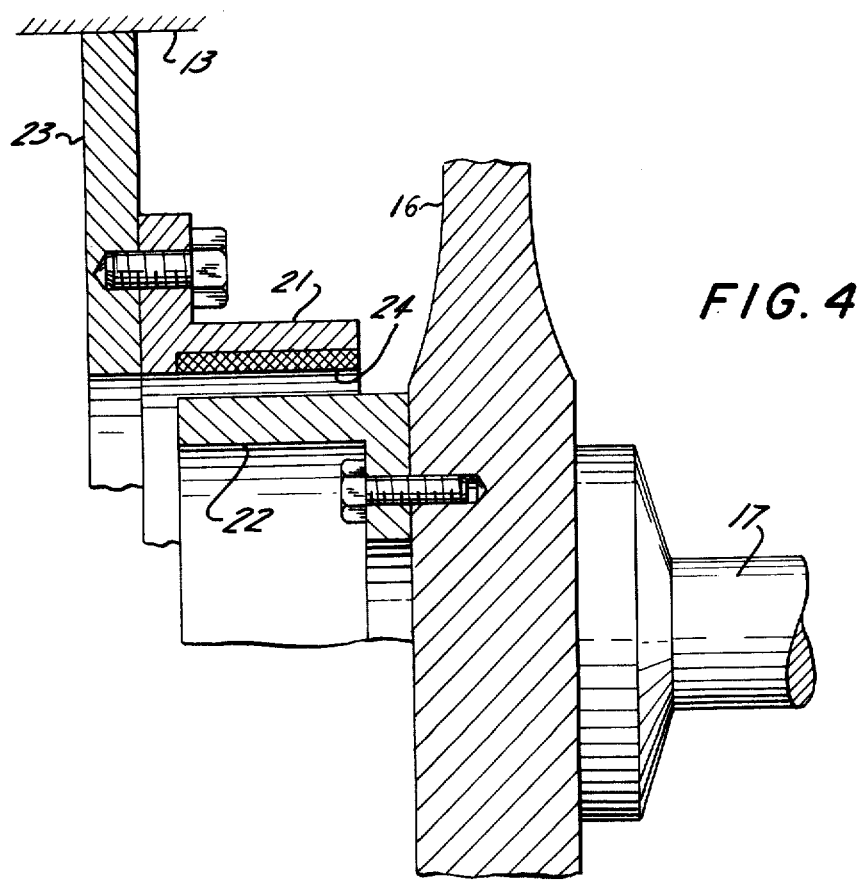
FIG. 4 is a semischematic view on an enlarged scale, showing the invention as employed on an overhung shaft system such as the power turbine of FIG. 3.

FIG. 4 is a fragmentary view on an enlarged scale of a bearing arrangement such as shown in the environment of FIG. 3. The journal section 22 may be a flanged annular member bolted to the rotor 16, as shown in FIG. 4, or an integral portion of the rotor as in FIG. 3, or a forward extension of shaft 17, or some other convenient rotating portion of the overhung section of a shaft system, when used with a two-bearing system. The journal 22 will ordinarily be formed of steel, but may be formed of other materials in systems wherein special conditions exist.

The emergency bearing 21 shown in FIG. 4 is a flanged annular member bolted to the wall member 23, but may be otherwise supported. The bearing 21 has an inner diameter larger than the outer diameter of journal 22, the radial spacing between the two diameters being no greater than the maximum transverse vibration tolerable in the event of excess imbalance. The inner surface 24 of the bearing member 21 is the bearing surface, prepared in a manner described hereinafter. If excessive imbalance occurs, the oscillation in the shaft system will bring the journal member into contact with the bearing surface 24, and the amplitude of vibration will be limited to the amount shown by the flat portion of the solid-line curve of FIG. 2.

Figure 5:
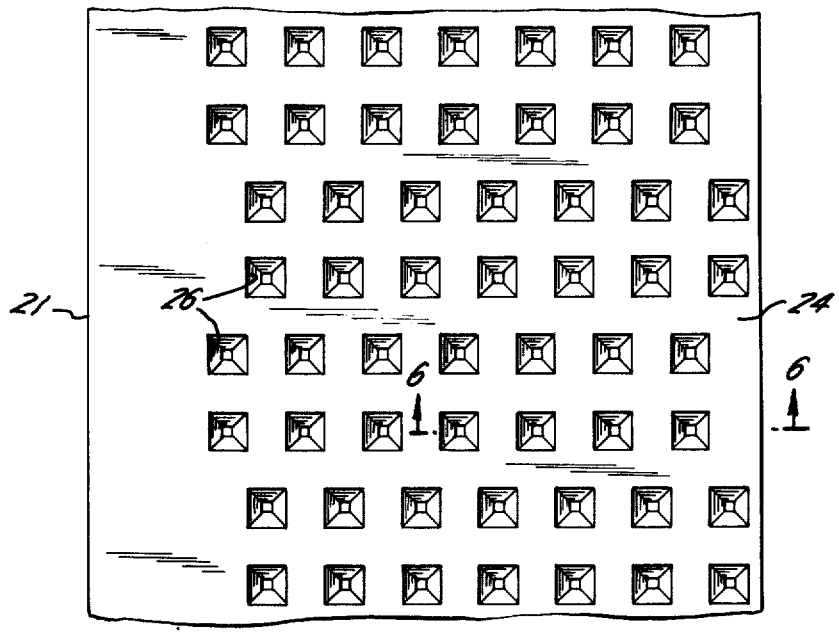
FIG. 5 is a fragmentary development of the bearing surface of one mode of construction of the emergency bearing.
Figure 6:
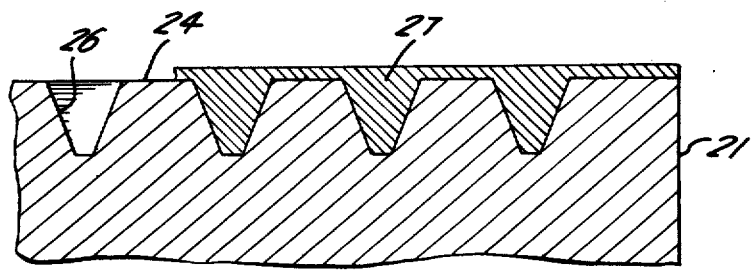
FIG. 6 is a fragmentary cross-section taken on line 6—6 of FIG. 5.

FIG. 5 is a fragmentary development of the bearing surface 24 of member 21, and FIG. 6 is a fragmentary cross-section taken on line 6—6 of FIG. 5. The inner surface 24 of bearing member 21 is provided with a plurality of recesses or indentations 26, although the recesses are shown of inverted tetrahedral form, that is, square in outline and tapering inwardly to a flat bottom, they may be of any convenient form. Recesses 26 may be formed by a punch, by a rolling tool having projections thereon, by knurling, or other suitable means. Bearing member 21 may be formed of any suitable materials, ordinarily steel, and FIG. 5 shows the recesses before the addition of the bearing metal shown in FIG. 6.

The recesses 26 form reservoirs which are filled with a suitable bearing material 27, as seen in FIG. 6, and the remainder of surface 24 is coated with the bearing metal. The bearing metal 27 may be any metal which is capable of running in the dry or unlubricated state, without seizing, for brief periods; various alloys of silver are examples of such a material. One particularly suitable metal is the silver brazing composition known as AMS-4770 (Aerospace Material Specification), having the following nominal composition:

| | |
|---|---|
| Silver | 50% |
| Cadmium | 18 |
| Zinc | 16½ |
| Copper | 15½ |

Although this composition is known as a brazing material, its action in the present invention is of quite different nature. The reservoirs 26 are filled with it in the molten state, and the remainder of surface 24 is given a thin coating. The thickness of the coating is not critical, except that it should not be thick enough that its surface in the unused state will be in contact with the journal, or contact it in the normal vibration during run-up. Further, the inner diameter of member 21 before coating should be such that when the coating is worn away and the journal runs against the backing metal of member 21 the amount of vibration allowed will not be greater than the tolerable limit. In a gas power turbine a coating thickness of metal 27 of about .005 inch to about .010 inch has been found suitable. However, such parameters will vary with the kind and size of machine of which the emergency bearing forms a part.

If excessive imbalance occurs, the journal will come into contact with the coating of bearing metal 27 and further excursion of the shaft system in transverse vibration will be restrained. The thin coating of bearing material on the inner surface of member 21 will soon wear away, however, and vibration will increase to where the load is borne by the exposed surface of member 21 itself. Nevertheless, the reservoirs 26 provide a source of bearing metal 27 which continues to wipe out the reservoirs across the surface of member 21, providing sufficient bearing action to save the machine from damage during the time it takes to run down below the critical speed. For this reason the reservoirs 26 are staggered in the direction of rotation and the spacing between reservoirs in the axial direction is no larger than their dimension in the axial direction, so that no part of the surface of member 21 wipes dry without being in line with a source of more bearing material from the reservoirs.

The invention is not limited to use on the overhung end of a shaft system, nor is it limited to use in a system having only two service bearings. For instance, in a two-bearing system wherein the distance between bearings is relatively long, bending may occur therebetween, and the use of the emergency bearing of this invention at such a location may be appropriate. In a three-bearing system the heaviest mass will normally be spanned by two service bearings, with a third service bearing at another shaft location, usually at a relatively remote end of the shaft. Again, it may be desirable to position an emergency bearing between the middle bearing of the system and the far end bearing.

It will be seen from the foregoing that there is provided a combination shaft and bearing system wherein an emergency bearing not normally in contact with the shaft will come into service during any extraordinary condition of shaft vibration. The emergency bearing is of light weight and inexpensive construction and requires no lubrication during limited service, but will nevertheless protect the system from damage during the time required to shut down the machine. In some cases such a bearing and a appropriate journal member may be installed in an existing system which was not originally designed to incorporate such a protective measure.

What is claimed is:

1. In a rotary shaft system having at least two service bearings, vibration damping means in combination with the shaft system comprising a rotating journal member borne by a portion of the shaft system, and an emergency bearing circumferentially surrounding the journal member, the emergency bearing and its journal member being positioned in the shaft system at an axial location where bending occurs during conditions of extraordinary vibration, the diameters of the journal member and its emergency bearing being selected to provide radial spacing therebetween sufficient to allow normal vibration of the shaft system during acceleration and deceleration without contact between the journal member and the emergency bearing, the radial spacing being such as to provide such contact during conditions of extraordinary vibration and serving to damp such vibration, the journal engaging surface of the emergency bearing being provided with a silver alloy bearing material capable of operating for a limited period against the surface of the journal member without lubrication and without seizing.

2. The combination recited in claim 1, wherein the journal-engaging surface of the emergency bearing is provided with a plurality of recessed reservoirs, the reservoirs being filled with the silver alloy which during periods of operation of the emergency bearing is progressively wiped by the journal member across the journal-engaging surface of the bearing member.

3. The combination recited in claim 2, wherein the reservoirs are staggered in the direction of rotation and the axial dimension of the reservoirs is at least as great as the axial spacing therebetween so that all portions of the engaging surface of the bearing member are circumferentially in line with some of the reservoirs.

* * * * *